United States Patent Office 3,148,169
Patented Sept. 8, 1964

3,148,169
CURABLE POLYETHYLENE COMPOSITION COMPRISING A PEROXIDE CONTAINING TERTIARY CARBON ATOMS, CLAY FILLER, AND AN ELECTRICAL CONDUCTOR INSULATED WITH THE COMPOSITION
Stanton C. Martens, New Haven, and Sidney Rothenberg, Fairfield, Conn., assignors to General Electric Company, a corporation of New York
Filed Dec. 1, 1960, Ser. No. 72,849
14 Claims. (Cl. 260—41)

The present invention is related to filled chemically cross-linked polyethylene and to electrical conductors insulated with such a composition.

Precopio and Gilbert Patent No. 2,888,424, May 26, 1959, which is assigned to the same assignee as the present application, described polyethylene cross-linked with a tertiary peroxide and containing as a filler material silica, carbon black, alumina, and calcium silicate. Example 6 of the Precopio and Gilbert patent recites the use of aluminum silicate as a filler material but points out that the tensile strength of the product was not measurable because it was so low. Example 5 of Precopio and Gilbert disclosed clay as another unsatisfactory filler material.

The present invention has as one of its objects to provide a cross-linked polyethylene mixture having high tensile strength and elongation using clay as a filler material.

Another object of the present invention is to provide a chemically cross-linked polyethylene containing clay filler which has been treated to eliminate impairment of the strength and elasticity qualities of the cured product.

Another object of the invention is to provide an electrical cable in which clay-filled chemically cross-linked polyethylene is used as the insulating material.

Figure 1:
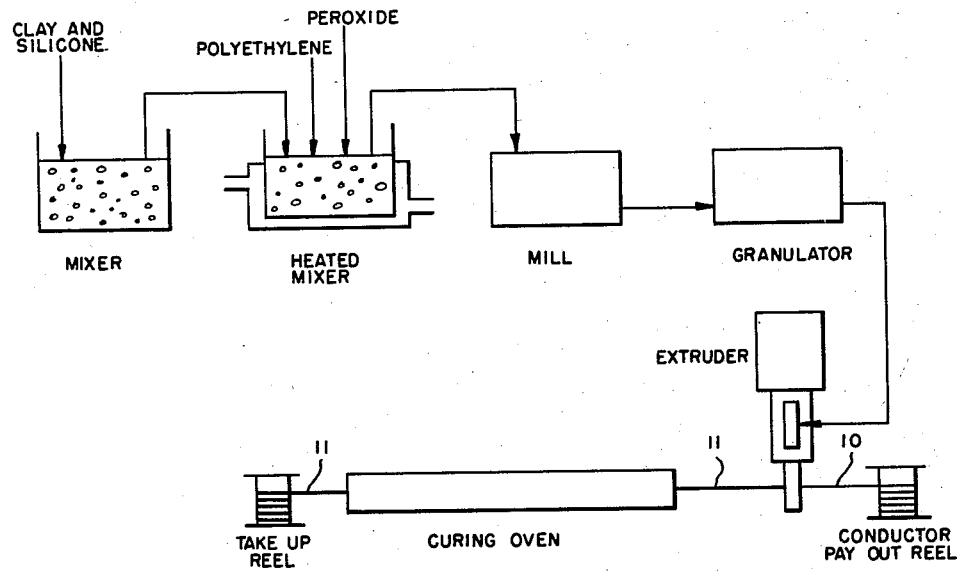
Figure 2:
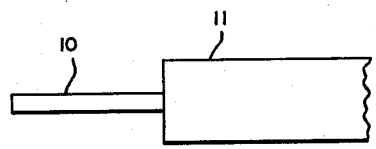

The above and other objects are accomplished in accordance with the following specification taken in conjunction with the drawing wherein FIG. 1 is a schematic diagram illustrating the sequence of steps to be followed in mixing the insulating compounds of this invention and extruding them as insulation on a conductor; and FIG. 2 illustrates a short length of electrical cable containing the structure provided by this invention.

Briefly stated, in accordance with one of its embodiments, the present invention is directed to a curable composition comprising (1) polyethylene, blends of polyethylene, blends of polyethylene and other polymers, and copolymers of ethylene and other polymerizable materials, (2) a peroxide in which there is present at least one unit having the structure

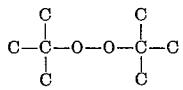

the decomposition temperature of which is in excess of 130° C., and (3) a filler consisting of aluminum silicate treated with a silicone liquid.

Referring to FIG. 1, clay and silicone are intimately admixed in a mixer after which they are introduced to a second heated mixer where their temperature is raised to about 120° C. and polyethylene is added and intimately admixed therewith. Peroxide is then added and the mixing continued until the mix has become uniform. The mixture is then introduced to a mill of the type used in rubber compounding. After it has been worked on the mill, it is granulated and is then ready for use as extruder feed stock.

The extruder operation consists of a conductor payout reel, an extruder, a curing oven, and a takeup reel. During passage of the conductor from the payout reel through the extruder, the insulating composition is extruded to form a coating of insulation on the conductor and the insulated conductor emerging from the extruder is passed slowly through a curing oven where cross-linking of the polyethylene takes place. The insulated conductor emerging from the curing oven is then wound upon the takeup reel.

As shown in FIG. 2, a copper conductor 10 emerges from the extruder with an enclosing insulating layer 11. The thickness of the layer 11 is controlled by the design and operating conditions of the extruder.

The clays useful as fillers in accordance with this invention are composed of over 95% aluminum silicate, the balance consisting of the oxides of iron, titanium, calcium, magnesium, potassium, and sodium. As long as the components other than aluminum silicate are relatively inert materials, their presence does not prevent the material from being a satisfactory filler in chemically cross-linked polyethylene. Accordingly, when the term "clay" or "aluminum silicate" is used herein, it is intended that up to 5% of the content can consist of inert impurities.

The processing of clays useful in this invention is described in a report contained in Industrial and Engineering Chemistry for May 1960, starting on page 370. The clay used in this invention has been calcined and possesses a particle size of the order of 2 microns diameter. Calcining should reduce its moisture content to less than 0.50% and its specific gravity should be about 2.6. In some cases, it is desirable that the clay be buffered to make it nonacidic but such treatment is not necessary where the clay is pretreated to mask the effect of its acidic character. Clays useful in this invention are readily available on the open market and it is only necessary to pretreat them in accordance with this invention in order to make them usable.

The pretreatment of the calcined clay in accordance with this invention consists of the admixture therewith of 0.1% to 10% by weight of the clay of a silicone fluid. This treatment imparts a hydrophobic character to the clay and, unexpectedly, masks the acidic nature of the clay so that cross-linking peroxides such as dicumyl peroxide, which would normally be deactivated by an acidic filler, are unaffected. Silicone liquids, or organopolysiloxanes, are well known and readily available on the open market and therefore will not be discussed in detail here. These compounds have a carbon to silicon linkage such as those disclosed and claimed in Agens Patent No. 2,448,756, Sprung Patents Nos. 2,448,556 and 2,484,595, Krieble et al. Patent No. 2,457,688, Hyde Patent No. 2,490,357, Marsden Patent No. 2,521,528, and Warrick Patent No. 2,541,137. While silicone liquids generally are usable in this invention, a preferred silicone liquid is octamethylcyclotetrasiloxane.

The polyethylene referred to herein is a polymeric material formed by the polymerization of ethylene. It is described in Patent No. 2,153,553, Fawcett et al., and in Modern Plastics Encyclopedia, New York, 1949, pages 268–271. Specific examples of commercially available polyethylene are the polyethylenes sold by E. I. du Pont de Nemours & Co., Inc., Wilmington, Delaware, examples of which are "Alathons 1, 3, 10, 12, 14, etc.," those sold by the Bakelite Company, such as "DFD–2005, DYNH, etc.," and the Phillips Petroleum Company polymers, such as "Marlex 20, 50, etc." Other polyethylenes of various molecular weights are described by Lawton et al. in Industrial and Engineering Chemistry, 46, pages 1703–1709 (1954).

Blends of polyethylene and other polymers as well as copolymers of ethylene and other polymerizable materials are operable in accordance with this invention. In general, it is the polyethylene content which is cross-linked but this is not necessarily the case. For example, polyurethanes derived from either polyesters or polyethers are cross-linked by the cross-linking agents of this invention and, thus, a blend of polyethylene and polyurethane can be highly cross-linked by the cross-linking peroxides of this invention.

The peroxides which are operable in this invention are in general those having at least one of the structural units $$C-\overset{C}{\underset{C}{C}}-O-O-\overset{C}{\underset{C}{C}}-C$$

wherein the decomposition temperature is above 130° C.

Among the tertiary peroxides which can be used to cure polyethylene containing the preferred fillers are those having the following formula

R—O—O—R′ where R and R′ (which may or may not be similar) are radicals selected from the group consisting of

and

These peroxides may be described as peroxides in which each of the peroxide oxygens is linked directly to a tertiary carbon atom whose remaining valences are attached to radicals selected from the group consisting of $R_1$, $R_2$, $R_3$, $R_4$, $R_5$, and $R_6$. $R_1$, $R_2$, $R_3$ and $R_4$ comprise alkyl radicals such as methyl, ethyl, propyl, butyl, pentyl, hexyl, heptyl, octyl, nonyl, decyl, undecyl, octadecyl, etc. and isomers thereof; cycloalkyl radicals such as cyclopropyl, cyclobutyl, cyclopentyl, cyclohexyl, cycloheptyl, cyclooctyl, etc.; alkylcycloalkyl radicals such as methylcyclobutyl, ethylcyclopentyl, tert-butyl-methylcyclohexyl, isopropylcyclohexyl, etc.; cyclo-alkyl-alkyl radicals such as cyclopropylmethyl, cyclopentylethyl, cyclohexylpropyl, etc.; aryl radicals such as phenyl, biphenyl, naphthyl, anthracyl, tolyl, xylyl, ethylphenyl, tert-butylphenyl, propylbiphenyl, ethylnaphthyl, tert-butyl-naphthyl, propylnaphthyl, etc.; aralkyl radicals such as benzyl, phenylethyl, naphthylpropyl, etc. The unit

is a radical wherein the tertiary carbon attached to the peroxide oxygen is contained within a hydrocarbon cyclic radical structure such as cyclopropyl, cyclobutyl, cyclopentyl, cyclohexyl, cycloheptyl, etc., an example of which is di-phenylcyclohexyl peroxide.

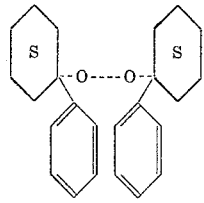

Mixtures of these peroxides may also be used.

In addition, these peroxides may contain inorganic groups, such as halogens, nitro groups, etc., for example, chlorophenyl, bromophenyl, nitrophenyl, etc.

The peroxides disclosed herein can be prepared by any of the methods known to the art. For example, di-α-cumyl peroxide

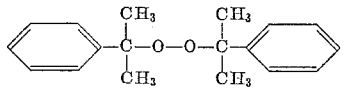

(sold by Hercules Powder Co. of Wilmington, Delaware), can be prepared by the method described by Kharash et al. in the Journal of Organic Chemistry, 15, pages 756–762 (1950), tert-butyl-α-cumyl peroxide

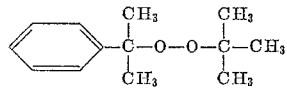

by the method of Kharasch et al. in the Journal of Organic Chemistry, 15, pages 775–781 (1950), etc.

The peroxides do not need to be monoperoxides, the following diperoxide being entirely satisfactory where a higher activation or decomposition temperature than that of di-α-cumyl peroxide is desired

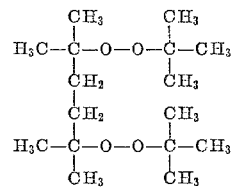

The following acetylenic diperoxide is particularly useful in an acidic system

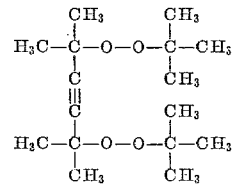

In addition to being low cost additives, the clay fillers of this invention impart excellent electrical properties to the final product and thus enable a superior electrical cable to be fabricated utilizing cross-linked polyethylene as an insulating material. Clay is the cheapest component of an insulation system consisting of cross-linked polyethylene filled with clay and therefore the maximum proportion of clay is added to the polyethylene. This can run as high as 100 parts of clay to 100 parts of polyethylene or blends or copolymers thereof. However, a more normal proportion which gives optimum physical and electrical properties is about 50 parts of clay per 100 parts of polyethylene, or blends or copolymers thereof. The use of clay-filled peroxide-cured polyethylene is demonstrated in the following examples which are given by way of illustration and not by way of limitation.

*Example 1*

To aluminum silicate (50 parts) there is added 1.5 parts of octamethylcyclotetrasiloxane and the mixture is tumbled until the octamethylcyclotetrasiloxane is uniformly dispersed therein. The mixture is then added to Bakelite DFD–2005 low density polyethylene (100 parts) in an internal mixer maintained at 120° C. until a homogeneous mix is obtained. Di-α-cumyl peroxide (3.2 parts) is then added to the mix. The composition is then milled on a rubber mill, granulated and used as feed stock for a conventional extruder for extruding insulating material on wire. The material is extruded on wire and cured by passage through a chamber where the wire is subjected to steam at a pressure of 250 p.s.i.g. After three weeks of subjecting a conductor prepared in accordance with this Example 1 to 600 volts A.C. while immersed in water at 75° C., the insulation resistance was 8619 megohms per 1000 feet. A control insulated conductor which was prepared in the same manner except that there was no octamethylcyclotetrasiloxane added to the aluminum silicate had its insulation resistance fall to 0.84 megohms per 1000 feet between the first day and first week after immersion.

*Example 2*

DYNH polyethylene (75 parts) and clorinated polyethylene (25 parts) is milled with aluminum silicate (75 parts) which has been pretreated with 7.5 parts of dimethyl silicone oil (100 centistokes viscosity at 25° C.) in the manner set forth in Example 1. An acetylenic peroxide (4 parts) of the following composition

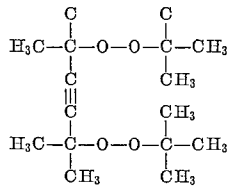

is added and the mixture is then extruded on wire and cured at a steam pressure of 270 p.s.i.g.

*Example 3*

A copolymer consisting of 100 parts of 90 mol percent of ethylene to 10 mol percent of butene-1 is milled with aluminum silicate (25 parts) which has been pretreated with a dimethyl silicone oil (5 centistokes viscosity at 25° C.) (1.25 parts). A peroxide (4 parts) having the following formula

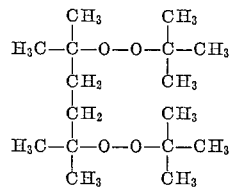

is added on the mill and the mixture then extruded onto a conductor in a conventional extrusion apparatus. The insulation is then cured in open steam at 270 p.s.i.g.

In many cases it is desirable to add an antioxidant during the milling operation. Suitable antioxidants for this purpose are the polymerized trimethyldihydroquinolines of Eastman application Serial No. 800,974, filed March 23, 1959, and now abandoned, which is assigned to the same assignee as the present application.

While the present invention has been described with reference to certain specific embodiments thereof, it is obvious that there may be variations which fall within the true spirit of the invention. Therefore, the invention should be limited in scope only as may be necessitated by the scope of the appended claims.

What we claim as new and desire to secure by Letters Patent of the United States is:

1. A curable composition comprising (1) a member selected from the group consisting of polyethylene, blends of polyethylene and other polymers, and copolymers of ethylene and other polymerizable materials, (2) a peroxide in which there is present at least one unit of the structure

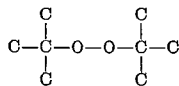

the decomposition temperature of which is in excess of 130° C., and (3) a filler consisting of aluminum silicate treated with a silicone liquid.

2. The composition of claim 1 which has been cured by heating to a temperature above the decomposition temperature of the peroxide.

3. Electrical cable comprising a conductor and a coating of insulation on said conductor consisting of a composition as claimed in claim 2.

4. The method of making electrical cable which comprises mixing (1) a member selected from the group consisting of polyethylene, blends of polyethylene and other polymers, and copolymers of ethylene and other polymerizable materials with (2) a peroxide in which there is present at least one group having the structure

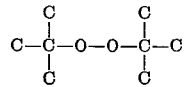

the decomposition temperature of which is in excess of 130° C. and (3) a filler consisting of aluminum silicate treated with a silicone liquid, extruding said mixture on an electrical conductor, and curing said mixture.

5. A curable composition comprising (1) a member selected from the group consisting of polyethylene, blends of polyethylene and other polymers, and copolymers of ethylene and other polymerizable materials, (2) a peroxide in which there is present at least one unit having the structural configuration

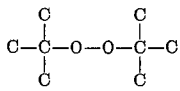

the decomposition temperature of which is in excess of 130° C., and (3) a filler consisting of aluminum silicate admixed with 0.1% to 10.0% of a silicone liquid.

6. A curable composition as claimed in claim 5 wherein the silicone liquid is octamethylcyclotetrasiloxane.

7. The composition of claim 5 in which the peroxide is di-α-cumyl peroxide and the aluminum silicate is nonacidic.

8. The composition of claim 5 which has been cured by heating to a temperature above the decomposition temperature of the peroxide.

9. Electrical cable comprising a conductor and a coating of insulation on said conductor consisting of a composition as claimed in claim 8.

10. The method of making electrical cable which comprises mixing (1) a member selected from the group consisting of polyethylene, blends of polyethylene and other polymers, and copolymers of ethylene and other polymerizable materials with (2) a peroxide in which there is present at least one unit having the structural configuration

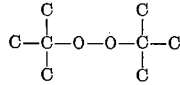

the decomposition temperature of which is in excess of 130° C., and (3) a filler consisting of aluminum silicate admixed with 0.1% to 10.0% of a silicone liquid, extruding said mixture on an electrical conductor, and curing said mixture.

11. The method of claim 10 wherein the silicone liquid is octamethylcyclotetrasiloxane.

12. The method of claim 10 wherein the peroxide is di-α-cumyl peroxide.

13. The method of claim 10 wherein the peroxide has the composition

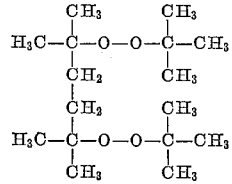

14. The method of claim 10 wherein the peroxide has the composition

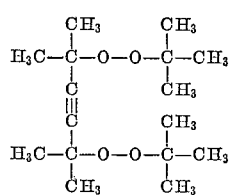

References Cited in the file of this patent

UNITED STATES PATENTS

| | | |
|---|---|---|
| 2,888,424 | Precopio et al. | May 26, 1959 |
| 2,928,802 | Rehner et al. | Mar. 15, 1960 |